C. A. HENNICKE.
COUPLING DEVICE OR SPLICE FOR WAGON OR TRAILER TONGUES.
APPLICATION FILED AUG. 16, 1919.
1,339,335.
Patented May 4, 1920.
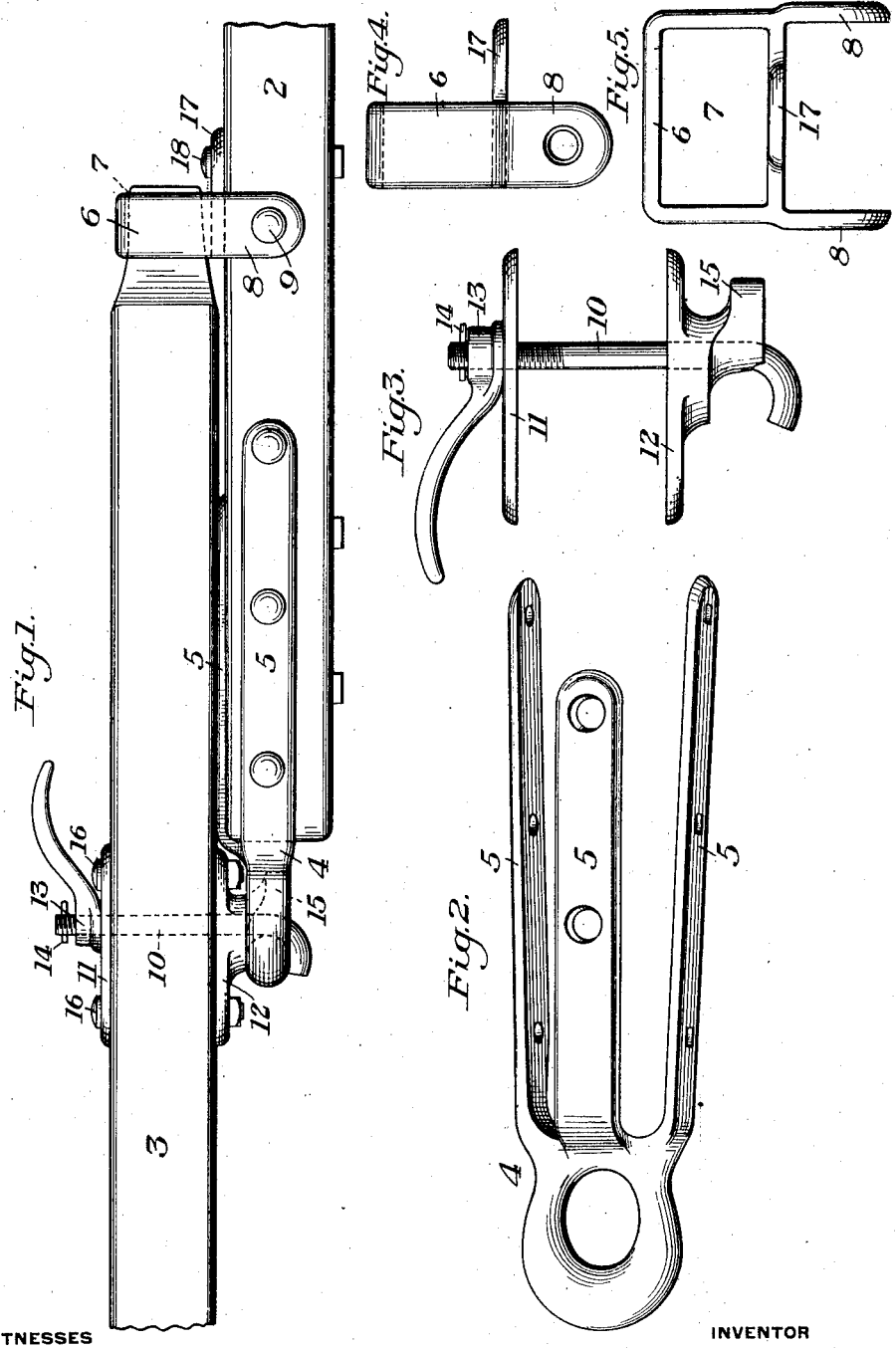

UNITED STATES PATENT OFFICE.

CHARLES A. HENNICKE, OF CLEVELAND, OHIO.

COUPLING DEVICE OR SPLICE FOR WAGON OR TRAILER TONGUES.

1,339,335. Specification of Letters Patent. Patented May 4, 1920.

Application filed August 16, 1919. Serial No. 318,003.

*To all whom it may concern:*

Be it known that I, CHARLES A. HENNICKE, a citizen of the United States, residing at Cleveland, in the county of Cuyahoga and State of Ohio, have invented a new and useful Improvement in Coupling Devices or Splices for Wagon or Trailer Tongues, of which the following is a full, clear, and exact description, reference being had to the accompanying drawing, forming part of this specification, in which:—

Figure 1 is a side elevation showing the application of my invention.

Fig. 2 is a perspective view of the draw coupling.

Fig. 3 is a side view of the front coupling device and clamp, and

Figs. 4 and 5 are, respectively, side and end elevations of the tongue support or socket.

My invention has relation to coupling devices or splices for lengthening wagon or trailer tongues for the purpose of making such tongues adaptable for use with horse-draft or mule teams. The introduction of farm tractors has made it necessary to so adapt farm wagons and other farm vehicles that they can be readily coupled to a tractor. This usually necessitates shortening the tongue or pole of the vehicle to such an extent that it cannot be used with horse or mule teams.

My invention provides a strong, simple and convenient means by which a shortened vehicle tongue of this character may be lengthened to make it suitable for use with such teams.

The nature of my invention will be better understood by reference to the accompanying drawing in which I have shown a preferred embodiment thereof and which will now be described, it being premised, however, that various changes can be made in the details of construction, arrangement and combination of the several parts, without departing from the spirit and scope of my invention as defined in the appended claims.

In this drawing the numeral 2 designates the forward end portion of a shortened tongue of a trailer or other vehicle; and 3 designates a portion of a lengthening section which is spliced or coupled to such tongue in accordance with my invention.

4 designates a draw coupling iron having a plurality of straps 5 which are adapted to be secured to the forward end portion of the shortened tongue 2 by bolts or other suitable means, as shown in Fig. 1, with its coupling eye or link projecting in advance of the end of such tongue. 6 designates a support or socket which is provided with the opening 7 for engagement with the end portion of the splice tongue 3 and with the depending lugs or straps 8 which are secured to the tongue 2 by any suitable means such as the bolt 9.

10 designates a hook bolt which is inserted through the splice tongue 3 and the lower hooked end portion of which is adapted to engage the eye or link of the draw coupling 4. This bolt also passes through the upper and lower clamp plates 11 and 12 and its threaded upper end portion is provided with a nut 13 secured against displacement and possible loss by means of a suitable pin or cotter 14. The lower clamp plate 12 is provided with a downwardly extending hook projection 15 which is adapted to fit within the eye of the draw coupling 4.

The parts being assembled in the manner shown in Fig. 1 and the nut tightened, the splice tongue 3 is securely clamped to the tongue 2. By operating the nut to loosen the same the hook of the bolt 10 may be turned around to project backwardly. In this position it will pass through the opening in the eye or link of the draw coupling and the splice tongue can then be readily disengaged and removed.

The plates 11 and 12 are provided with suitable holes for the reception of bolts 16 for securing them to the splice tongue 3. The tongue socket or support 6 is also shown as having the rearwardly projecting brace lug 17 provided with an opening which seats a bolt 18 extending through the tongue.

The construction is a simple and convenient one for the purpose and provides means whereby the splice tongue can be quickly and easily coupled to or removed from the vehicle tongue.

I claim:

1. In a coupling or splice device of the character described, the combination with a draw iron having means for its attachment to one of the two members to be coupled, and also having an eye, of a plate adapted to be attached to the other member to be coupled, said plate having an eccentric projection constructed to fit within the said eye, and a clamping bolt arranged to pass through the said projection and having a hooked end portion which can be turned into and out of engaging position with said projection, substantially as described.

2. In a coupling or splice device of the character described, the combination with a vehicle tongue having a projecting eye at its forward end, of an extension member arranged to overlap the forward end portion of the tongue, and having a downward projection secured to its under side, and which is constructed to fit within said eye and releasable locking means for securing the projection within the eye, said locking means comprising a clamp bolt having a hook at its lower end, said bolt extending through said eye and projection and arranged to pass the projection when the bolt is turned to a certain position; substantially as described.

In testimony whereof, I have hereunto set my hand.

CHARLES A. HENNICKE.